July 24, 1951     P. R. BRADLEY     2,561,648
PIPE JOINT
Filed Feb. 19, 1948
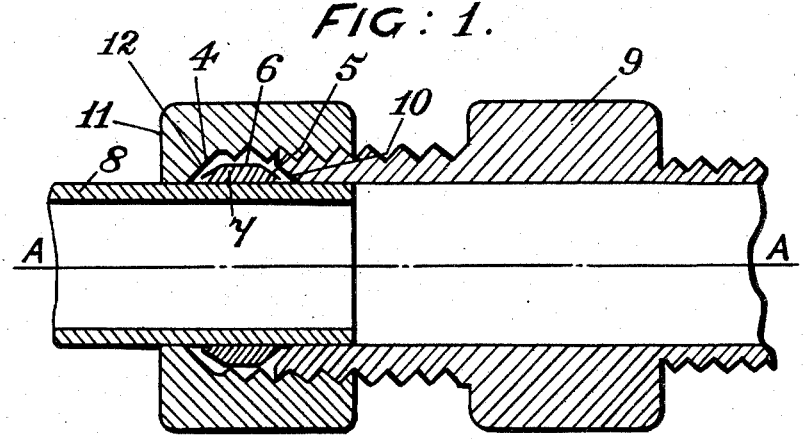
FIG: 1.
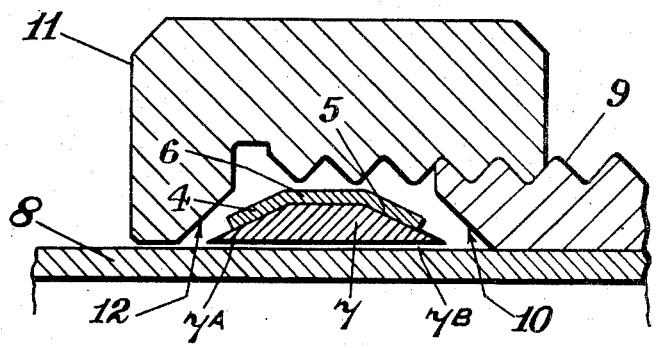
FIG: 2.
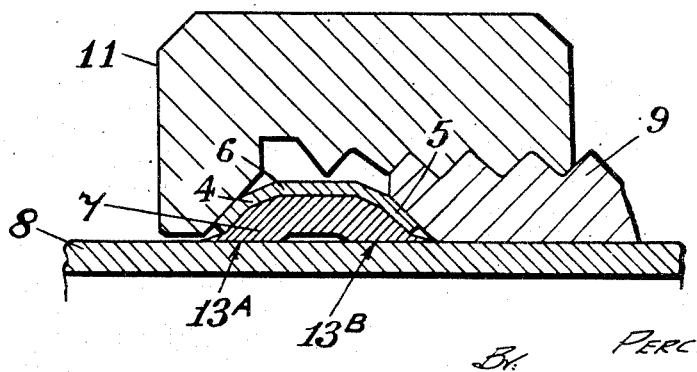
FIG: 3.
INVENTOR
PERCY R. BRADLEY
BY
Young, Emery & Thompson ATTYS.

Patented July 24, 1951

2,561,648

UNITED STATES PATENT OFFICE 2,561,648

PIPE JOINT

Percy Reginald Bradley, Falkirk, Scotland, assignor to The Falkirk Iron Company Limited, Falkirk, Scotland Application February 19, 1948, Serial No. 9,362
In Great Britain July 25, 1946

4 Claims. (Cl. 285—122)

This invention relates to pipe joints of the type in which an annular sealing member is compressed upon the pipe by the action of interengaging conical faces.

In accordance with the present invention, a pipe joint of the type stated has a composite annular sealing member comprising an outer hollow component of hard or comparatively hard metal presenting a convex conical face and an inner component of formative material, the sealing compression being applied to the outer component by a member of the joint presenting a concave conical face that forces the formative material to collapse upon the pipe and make seal therewith, and the joint is characterised in that the outer component is made to leave between it and the pipe an annular space permitting inward collapse of the outer component under the sealing compression.

Preferably, the inner component projects through the annular space to enhance the formation of the seal.

Preferably, the annular sealing member is double-ended, that is to say has provisions for sealing at both ends, so that two seals are formed under compression.

The invention will now be described by way of example with reference to the accompanying drawing, in which:

Fig. 1 is a section of the pipe joint. Fig. 2 is a fragmentary section, drawn to a magnified scale, showing in greater detail the places where the seals are to be made. Fig. 3 corresponds to Fig. 2 but shows the annular sealing member collapsed and the seals made.

In the drawing, the invention is illustrated as applied to a copper water pipe jointed to a screwed union. As shown, the composite annular sealing member includes as its outer component a thin annular copper sheath, which in the example is .015 inch thick and which is formed at opposite ends 4 and 5 with conical faces, said ends being joined by a cylindrical portion 6. In the example, the conical faces are inclined at an angle of 25° to the longitudinal axis A—A of the joint. The sheath 4, 5, 6 in cross-section is somewhat like a flattish V with the apex flattened. The inner component 7 is made of lead, which fills the outer sheath, so that in cross-section the sealing member is of trapezium shape. As shown best in Fig. 2, the lead filling projects slightly, say 1/32 inch through each end of the sheath, the projections being indicated by 7A and 7B, respectively. It will be clear that the formation of the sealing member's outer component 4, 5, 6 in relation to the water pipe 8 is such that, at the places of least diametral size of the conical ends 4 and 5, an annular space is left between each end 4 and 5 and the pipe, each such space serving as a longitudinally unobstructed passage for the lead filler and providing for accommodation of the associated projection 7A or 7B.

The union 9, which receives the end of the pipe 8, is internally coned at 10 to provide a conical face adapted to receive one of the conical faces of the annular sealing member, (namely, the face of the end 5). Likewise, a union nut 11, which embraces the pipe 8 and screws on the union 9, is internally coned at 12 to provide a conical face adapted to receive the other of the conical faces of the annular sealing member, (namely, the face of the end 4). The conical faces 10 and 12 of the union and the nut are inclined much more steeply than the conical faces of the annular sealing member; in the example, the faces 10 and 12 are inclined at an angle of 45° to the axis A—A.

When the nut 11 is screwed home more or less tightly on the union 9, as illustrated by Fig. 3, the conical faces 10 and 12 in the nut and union press upon the conical faces of the sealing ring, with the result that the ends 4 and 5 collapse inwards and the lead inner component 7 is deformed, being tightly compressed around the pipe at two places, indicated by 13A and 13B in Fig. 3, and making two tight and substantial seals between the pipe and both the union and nut.

It is found that by tightening the nut merely by hand the joint is watertight under pressures up to 30 lbs. per square inch and that by tightening further, say by giving a quarter turn to the nut by use of a spanner, the joint is watertight under pressures up to 800 lbs. per square inch.

In the example, the formative material used is lead, which is a sufficiently soft metal for the purpose. Instead, one may use appropriate materials of the kind known as "plastics."

I claim:

1. In a pipe joint including a compression member which embraces the pipe and has a concavely conical face, a composite annular sealing member comprising an outer hollow component composed of comparatively hard metal and an inner component composed of formative material softer than said pipe, said outer component having a conical portion to mate with the compression member, said portion at its place of least diametral size being made to leave between said portion and the pipe an annular passage for said formative material, so that said portion will collapse under compression by said member and will deform said inner component in proximity to said place of least diametral size to make seal there with the pipe.

2. In a pipe joint including a compression member which embraces the pipe and has a concavely conical face, a composite annular sealing member comprising an outer hollow component made as a thin shell of comparatively hard metal and an inner component composed of formative material softer than said pipe, said material filling said shell, said outer component having a conical portion to mate with the compression member and being made to leave between said portion and the pipe an annular passage for said formative material, and said inner component being made with an extension that projects through said annular passage, the arrangement being such that said portion will collapse under compression by said member and will deform said inner component including said extension to make seal with the pipe.

3. In a pipe joint including interconnected compression members which both embrace the pipe and have opposed concavely conical faces, a composite annular sealing member inserted between said members and comprising an outer hollow component composed of comparatively hard metal and an inner component composed of formative material softer than said pipe, said outer component having conical end portions to mate with the compression members, said portions at their places of least diametral size being made to leave between said end portions and the pipe annular passages for said formative material, so that said portions will collapse under compression between said members and will deform said inner component at its opposite ends to make seal with the pipe at two places.

4. In a pipe joint according to claim 3, a composite annular sealing member of which the inner component is made with extensions at both ends that project through the annular passages provided between said end portions and the pipe.

PERCY REGINALD BRADLEY.

REFERENCES CITED

The following references are of record in the file of this patent:

UNITED STATES PATENTS

| Number | Name | Date |
|---|---|---|
| 1,186,813 | McFerran | June 13, 1916 |
| 2,100,796 | Church | Nov. 30, 1937 |
| 2,414,995 | Wurzburger | Jan. 28, 1947 |